2,954,360

PROCESS FOR PRODUCING OXYGEN-CONTAINING CONDENSATION RESINS FROM AROMATIC HYDROCARBONS AND PRODUCT PRODUCED THEREBY

Hans Krzikalla, Ferdinand Meyer, and Frederic van Taack-Trakranen, Heidelberg, Germany, assignors to Badische Anilin- & Soda-Fabrik Aktiengesellschaft, Ludwigshafen (Rhine), Germany No Drawing. Filed Mar. 8, 1952, Ser. No. 275,668

Claims priority, application Germany Mar. 7, 1951

8 Claims. (Cl. 260—43)

This invention relates to oxygen-containing condensates of polynuclear, aromatic, non-alkylated hydrocarbons and aldehydes, and a process for preparation thereof, condensates thereof with a phenol and a process for preparation thereof, and a process, and products produced thereby, for the production of hardenable resins from the condensation products of a phenol with a resinous oxygen-containing reaction product of aromatic hydrocarbons and aldehydes. This application is a continuation-in-part of our application Serial No. 274,668, filed March 3, 1952, now abandoned.

The hardenable resins prepared from phenol and form-aldehyde by the known methods have certain disadvantages in the hardened state, for example low stability to water and alkalies as well as unfavorable dielectric properties. To avoid these defects it has already been proposed to condense alkyl- or aryl-substituted phenols with formaldehyde but without the said disadvantages being satisfactorily removed.

Moreover the known mixed condensation of aromatic hydrocarbons and phenols with formaldehyde does not yield entirely satisfactory products because in acid medium the speed or reaction of the phenol exceeds by a multiple that of the hydrocarbons, while in alkaline solution the hydrocarbons do not react at all.

It is also known to prepare from alkylated aromatic hydrocarbons and aldehydes in the presence of acids oxygen-containing condensation products, but these are not quickly hardenable. These condensation products may be modified to industrially valuable lacquer resins by heating with phenols in the presence of acid catalysts. According to a prior proposal, polynuclear non-alkylated aromatic hydrocarbons can also be condensed to products which can be reacted with phenols if the condensation of the hydrocarbons with the aldehyde is carried out under mild conditions and is interrupted at the right time.

We have now found that the condensation products of phenols with the oxygen-containing resinous reaction products of aromatic hydrocarbons and aldehydes can be further condensed to hardenable resins by reaction with aldehydes, in particular formaldehyde and its polymers or with compounds which split off aldehydes, such as hexamethylene tetramine. The employed reaction products of aromatic hydrocarbons and aldehydes contain usually from 5 to 12% oxygen.

When employing acid condensing agents, there are obtained by this process resins of novolac character which can be hardened out in known manner with formaldehyde or substances which split off formaldehyde, for example with hexamethylene tetramine, at temperatures above 100° C. These new resins can be worked up into pressing masses with a great variety of fillers in the same way as the condensation products from phenol and formaldehyde.

By carrying out the condensation in alkaline medium, resins similar to resol are obtained. They can serve as stoving varnish and may be employed in particular for the production of waterproof hard papers having especially good electrical insulating properties.

The solubility and the compatibility of the products with other natural or synthetic resins or with drying oils can be adapted to the given requirements according to the nature of the hydrocarbons and phenols employed.

It is also possible, however, to add to the condensation products from phenols and oxygen-containing reaction products of aromatic hydrocarbons and aldehydes, before their further condensation with aldehydes or substances which split off aldehydes, compounds which only are capable of reacting with the formation of hardenable resins in the presence of free aldehydes, as for example acid amides, phenols, amines, urethanes and ketones.

Since the resins prepared according to this process usually contain more than 50% of hydrocarbons, it is surprising that they will nevertheless react with aldehydes both in acid and alkaline solution to form resins which as regards their hardenability are equal to the pure phenol resins, while on the other hand their hydrocarbon character finds expression to a great extent in increased chemical stability and considerably better dielectric properties.

In addition to these technical advantages, the resins also have further economic advantages because the valuable phenol is replaced to the extent of more than half by more readily accessible and cheaper aromatic hydrocarbons.

Fillers, dyestuffs or pigments may also be added to the new resins during their working up. The addition of graphite, carbon black or similar carbonaceous materials to the resins is of special interest. The mixtures of these resins and the carbonaceous substances may be used for the production of non-corrosive apparatus and are characterized by good electrical conductivity. It is preferable to use for each part by weight of resin about an equal amount or more of the carbonaceous substances.

There may also be added to the resin masses small amounts of high molecular, highly chlorinated aliphatic hydrocarbons, for example of paraffins, with about 20 carbon atoms, whereby the capacity of the masses for being worked up is facilitated.

The making of oxygen-containing resins obtained by the reaction of non-alkylated polynuclear hydrocarbons and aldehydes and their condensation with phenols are described in our co-pending application, Ser. No. 274,668, filed March 3, 1952 now abandoned, the subject matter thereof being claimed herein.

By this process reactive resins having an oxygen content of from 5–12% are obtained by reacting non-alkylated polynuclear aromatic hydrocarbons, as for example naphthalene, phenanthrene or technical-grade mixtures of these substances, with more than 1.5 times the molar amount of aldehyde, advantageously by formaldehyde or its polymers, in the presence of dilute acids for only such a time that the resulting resins are yet clearly soluble in ethyl alcohol after heating with phenol and acid catalysts. The further reaction of these oxygen containing resins from non-alkylated polynuclear aromatic hydrocarbons and aldehydes with phenols is carried out by heating said resins with a phenol in the presence of an acid catalyst. Examples of acid catalysts applicable for this purpose are benzene sulfonic acid, sulfuric acid, hydrochloric acid, boronfluoride, acetic acid, p-toluene sulfochloride and surface-active acid bleaching earths.

As disclosed in the aforesaid copending application Serial No. 274,668, the condensation of the polynuclear, aromatic, non-alkylated hydrocarbons and the aldehydes may be carried out employing dilute acids, as for example, 10% or even more dilute sulfuric acid. These resins are produced by condensing the aforesaid reactants in the dilute sulfuric acid for a controlled time. In this way it is possible to interrupt the reaction at a stage of condensation at which the aromatic nuclei are connected essentially by methylene ether bridges, probably after the nature of acetals, so that the resins formed have an oxygen content from 5 to 12%.

If the condensation be carried still further, such a resin is converted, depending on the relative proportions of the mixture of initial materials, more or less quickly into products which are poorer in oxygen and slow to react.

The condensation may also be carried out in autoclaves without loss of aldehyde at higher temperatures and in this way a shortening of the condensation time may be brought about, when using more dilute acids, as for example 10% or even more dilute sulfuric acid.

When the condensation is completed, the aqueous layer is first removed by decantation; the resin is then dissolved in a suitable organic solvent, as for example benzene or toluene, purified by filtration or sedimentation and obtained in a pure, clear form after evaporation of the solvent. The condensation product may also be purified, however, by means of hot water or by a steam distillation, the mass then being melted together by heating, advantageously in vacuo, to a clear resin.

The primarily formed resin dispersion may also be used for further chemical reactions without purification if desired.

We have also found that products which are of special value industrially are obtained by further reaction of these oxygen-containing naphthalene-formaldehyde resins with substances which are capable of reacting with formaldehyde, advantageously with phenols or phenol derivatives. This reaction proceeds in the presence of acid catalysts with the splitting off of water. For carrying out this reaction phenol, cresols, xylenols, alkylphenols, arylphenols, aralkylphenols, cycloalkylphenols, aminophenols, nitrophenols, salicylic acid, hydroquinone, resorcinol, phloroglucin, pyrocatechol, naphthols, hydroxyanthracenes, and sulfonic acid amides, either alone or in admixture with each other, are especially suitable in so far as they still have a reactive hydrogen atom in an aromatic nucleus containing a hydroxyl group. As acid catalysts there may be employed benzene sulfonic acid, sulfuric acid, hydrochloric acid, boronfluoride, acetic acid, p-toluene sulfochloride and surface-active acid bleaching earths.

When one of the reactants itself reacts strongly acid, the addition of further catalysts may be dispensed with.

The condensation products thus obtained are, depending on (a) the nature of the employed oxygen-containing resin from non-alkylated polynuclear aromatic hydrocarbons and formaldehyde and (b) on the nature of the substances used for the after-condensation, soft to hard, brittle or elastic resins which are soluble either in alcohol, aromatic hydrocarbons or in benzene and are suitable for the production of lacquers and masses for pressing.

The following examples will further illustrate this invention but the invention is not restricted to these examples. The parts are by weight.

*Example 1*

115 parts of water, 85 parts of concentrated sulfuric acid and 114 parts of 98% paraformaldehyde are dissolved by heating and into the solution, heated to 90° to 100° C. there are slowly introduced 120 parts of naphthalene. The reaction mixture is then heated to boiling under reflux. The resinification begins after 2 to 3 hours. Samples withdrawn from the reaction mass yield completely clear solutions when they are heated with about the same weight of phenol and a trace of toluene sulfochloride and subsequent dissolution in 5 times the amount of ethyl alcohol. The resin then remains in this reactive state until the free unreacted naphthalene is combined. The progress of the reaction is followed by constantly withdrawing samples. The commencement of the formation of too highly condensed resins becomes evident by poorer solubility of the reaction product with phenol in alcohol.

The reaction mass is then allowed to cool, the aqueous layer is removed by siphoning off, the residual acid is neutralized with sodium carbonate, and the unreacted formaldehyde and any free naphthalene still present is driven off with steam. The resin is then dissolved in benzene and the solution clarified by sedimentation. By evaporating the benzene from the clear solution, if necessary in vacuo, there is obtained a clear, pale yellow, tough resin which is soluble in aromatic hydrocarbons, glycol, tetrahydrofurane and methylene chloride. It has a softening point of 52° C. and an oxygen content of 7.5%.

500 parts of the oxygen-containing naphthalene-formaldehyde-resin obtained as described above are mixed with 500 parts of phenol (1:1 weight ratio of phenol to oxygen-containing resin) and 0.75 part of p-toluene sulfochloride and heated for 3 hours at 150° to 160° C. while distilling off 40 parts of water. The cooled reaction product is then boiled under reflux for 40 minutes with 730 parts of 30% formaldehyde and 34 parts of concentrated ammonia. After decanting the aqueous layer, the resin is freed from adherent water in vacuo. The yield is 1010 parts of a pale yellow, clear, hard resin having as oftening point of 85° C.

The resin is clearly soluble in a mixture of 90 parts of toluene and 10 parts of alcohol and after application to an iron sheet and stoving for ¾ hour at 165° C. yields a hard insoluble film which is stable to dilute and strong alkalies and acids and shows no sign of corrosion after immersion for several weeks in 3% common salt solution.

The resin may be worked up by known methods to hard paper, and a high quality electrical material having very good mechanical strength is obtained. Upon immersion in water, a pressed rod of this material absorbs less than half the amount of water that other hard papers do.

*Example 2*

450 parts of a condensation product from an oxygen-containing naphthalene-formaldehyde resin and phenol prepared according to Example 1 are heated to boiling under reflux for 20 minutes with 315 parts of 30% formaldehyde and 2 parts of concentrated hydrochloric acid. After decanting the aqueous layer and removing the adherent water by distillation in vacuo, 460 parts of a pale, hard, clear resin are obtained which has a softening point of 100° to 110° C. The resin can be worked up into pressing masses in known manner like the usual phenol-formaldehyde resins.

*Example 3*

114 parts of paraformaldehyde are dissolved in 230 parts of 35% sulfuric acid and 112 parts of naphthalene are added. The reaction mass is heated to 90° C. and stirred. The resin formation, which commences in the course of 8 hours, is constantly supervised by tests of withdrawn samples as described in Example 1. After a condensation duration of 12 hours, the withdrawn samples, after heating with phenol, are still clearly soluble in 5 times the amount of alcohol but a slight turbidity forms upon further dilution with alcohol. The condensation is then interrupted by cooling. The resin cake is then freed from aldehyde and acid by repeated washing with hot water and then fused together to a clear, thickly viscous oil by heating for 4 hours in vacuo at 80° to 90° C. The condensation product has an oxygen content of 8.9%.

*Example 4*

225 parts of an oxygen-containing naphthalene-formaldehyde condensation product (oxygen content 8.1%) are heated with 94 parts of phenol in the presence of 0.3 part of p-toluene sulfochloride for 3 hours at 150° C. (0.4:1 weight ratio of phenol to oxygen-containing resin). After distilling off 20 parts of water, 290 parts of a hard resin are obtained.

150 parts of this resin are worked up in known manner into a pressing mass with 75 parts of an acid condensed phenol-formaldehyde resin of the novolac type, 235 parts of wood meal, 22.5 parts of hexamethylene tetramine, 5 parts of magnesium oxide and 5 parts of an oxidatively bleached montan wax and pressed under pressure at 170° C. The pressed article corresponds in its mechanical properties to pure phenol-formaldehyde pressed masses.

*Example 5*

26 parts of a condensation product of the novolac type prepared according to Example 2 by condensation of a phenol-modified oxygen-containing naphthalene-formaldehyde resin with formaldehyde under acid conditions, 70 parts of graphite, 3 parts of hexamethylene tetramine and 1 part of a highly chlorinated paraffin having 18 to 22 carbon atoms are mixed in known manner on mixing rollers and pressed into any desired shaped articles at 170° C. under a pressure of 150 kilograms per square centimetre.

*Example 6*

225 parts of a naphthalene-formaldehyde resin prepared as described in Example 1 are heated together with 63 parts of phenol (0.28:1 weight ratio of phenol to resin) and 0.3 part of p-toluene sulfochloride for an hour at 100° to 130° C., 15 parts of water thus being distilled off. A pale, hard and clear resin is obtained which dissolves in a mixture of toluene and a little alcohol and which after application to an iron sheet and burning in for 3 to 4 hours at 200° to 220° forms an insoluble film.

Based on the limits of the examples, the ratio of phenol to the oxygen-containing condensation resin of the polynuclear, aromatic, non-alkylated hydrocarbon and formaldehyde or paraformaldehyde is in the range of 0.28–1 part by weight of said phenol per part of said resin.

What we claim is:

1. A process for production of oxygen-containing condensation resins containing 5–12% oxygen from polynuclear, aromatic, non-alkylated hydrocarbons which comprises condensing, in 10–35% sulfuric acid aqueous solution, a polynuclear, aromatic, non-alkylated hydrocarbon with a compound selected from the group consisting of formaldehyde and paraformaldehyde at a mol ratio of at least 1.5 mol equivalents of formaldehyde per mol of said hydrocarbon at a temperature in the range of from 90° C. up to the reflux temperature of the reaction mixture until the condensate of said aromatic hydrocarbon and said compound has an oxygen content of 5–12%, and then cooling the reaction mixture to stop the condensation reaction.

2. A process for production of oxygen-containing condensation resins of naphthalene and formaldehyde, said resins containing 5–12% oxygen, which comprises condensing, in 10–35% sulfuric acid aqueous solution, naphthalene with a compound from the group consisting of formaldehyde and paraformaldehyde at a mol ratio of at least 1.5 mol equivalents of formaldehyde per mol of naphthalene at a temperature in the range of from 90° C. up to the reflux temperature of the reaction mixture until the condensate of said naphthalene and said compound has an oxygen content of 5–12%, and then cooling the reaction mixture to stop the condensation reaction.

3. The process in accordance with claim 2 wherein said compound is paraformaldehyde.

4. A resinous condensation product containing 5–12% oxygen produced by the process of claim 2.

5. A process for the production of hardenable resins useful in lacquers and molding which comprises condensing at a temperature of about 100° C. to 160° C. a product produced in accordance with the process of claim 1 with 0.28–1 part by weight of phenol per part of said product of claim 1 in the presence of an acid catalyst with the removal of water formed in the condensation reaction until a solid resin is formed.

6. The product produced in accordance with the process of claim 5.

7. A process for the production of resins useful in coatings and molding which comprises condensing at a temperature above 100° C. a compound selected from the group consisting of formaldehyde, paraformaldehyde, and hexamethylene tetramine with a resin produced in accordance with the process of claim 5 until a hard, clear resin is produced.

8. The product produced in accordance with the process of claim 7.

References Cited in the file of this patent

UNITED STATES PATENTS 2,330,827   Kester _____ Oct. 5, 1953

FOREIGN PATENTS 576,745   Great Britain _____ Mar. 4, 1943